March 12, 1935.  A. C. SENGER  1,994,370
AUTOMOBILE GENERATOR CONTROL
Filed April 20, 1932
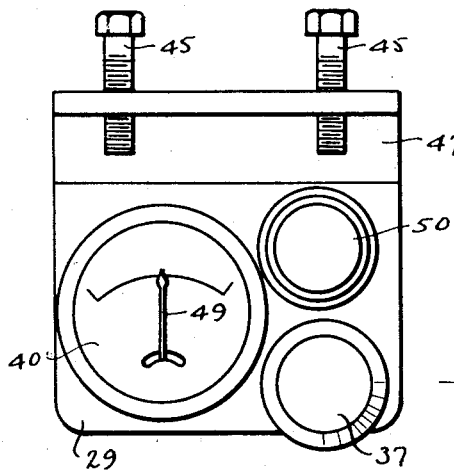
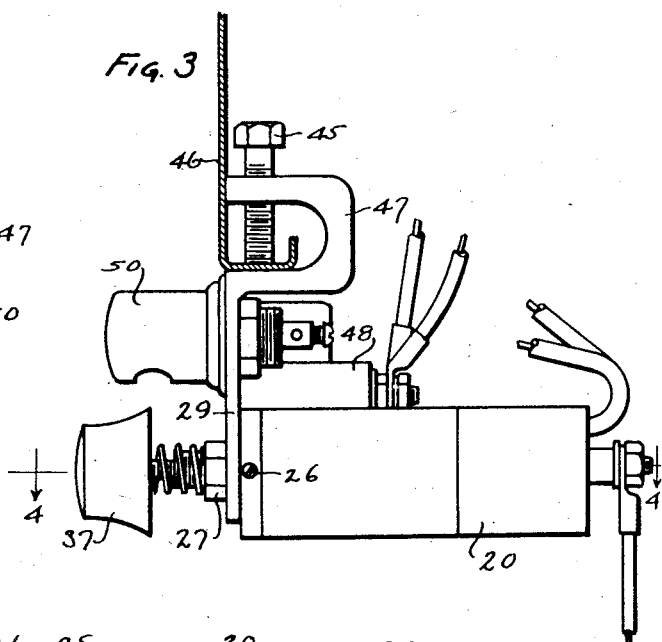
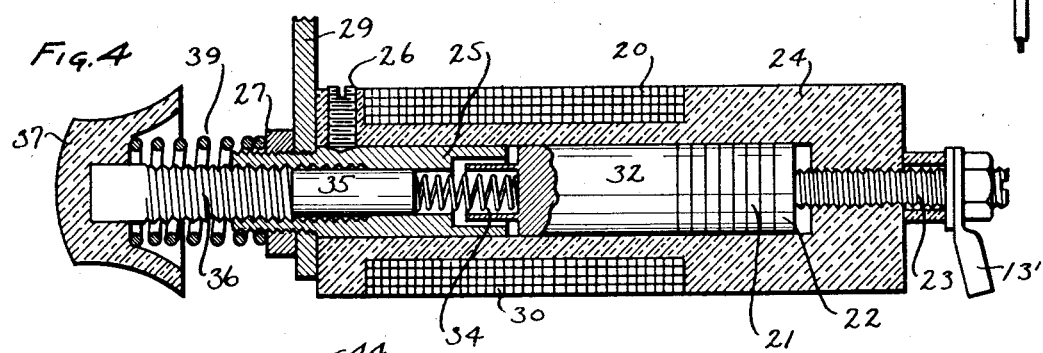
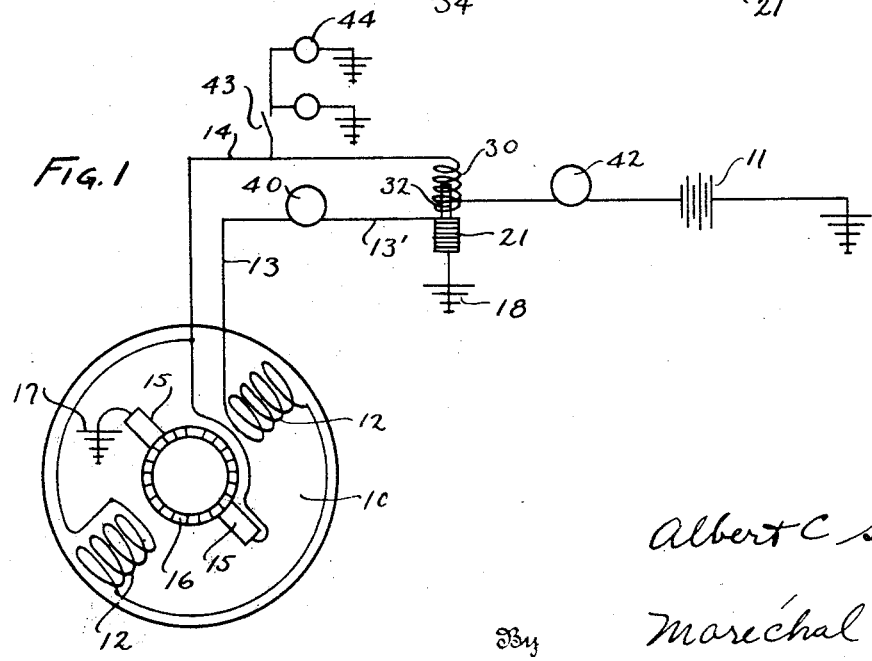
Inventor
Albert C Senger
By Maréchal & Noe
Attorney Patented Mar. 12, 1935

1,994,370

UNITED STATES PATENT OFFICE 1,994,370

AUTOMOBILE GENERATOR CONTROL

Albert C. Senger, Hamilton, Ohio

Application April 20, 1932, Serial No. 606,417

2 Claims. (Cl. 171—229)

This invention relates to automobile battery charging apparatus in which the battery is charged by means of an engine driven generator.

One object of the invention is the provision of a regulator of sturdy and simple construction which will automatically maintain the battery charging current at a substantially constant predetermined value under various load conditions of the generator.

Another object of the invention is the provision of a regulator of the character mentioned for use in conjunction with a shunt wound generator of the fixed brush type, and having provision for controlling a variable resistance connected in series with the shunt winding of the generator so as to automatically maintain the generator charging current at a substantially constant value regardless of the generator load and regardless also of the generator speed.

A further object of the invention is the provision of a compact assembly adapted to be mounted adjacent the driver's location so that it may be connected with the generator but provided at a point where it may be readily and quickly adjusted for variation of the charging rate of the battery.

Other objects and advantages of the invention will be apparent from the following description, the appended claims and the accompanying drawing, in which—

Fig. 1 is a diagrammatic view of a battery charging system embodying the present invention;

Fig. 2 is a front elevation of a unit assembly adapted to be mounted adjacent the driver's location of an automobile;

Fig. 3 is a side elevation of the unit assembly; and

Fig. 4 is a central sectional view of the battery charge regulator.

Referring more particularly to the drawing by reference numerals, like numerals designating similar parts in the various views, 10 designates an engine driven battery charging generator of an automobile or the like, by means of which charging current is supplied to the storage battery 11. As herein shown the generator 10 is a two-pole shunt wound device having the shunt winding 12 extending around the two poles and connected at one end to a lead 13, the opposite end of the winding being connected to a lead 14. The two brushes 15 are provided on diametrically opposite portions of the armature 16. One of the brushes is grounded as indicated at 17 and the lead 13' forming a continuation of lead 13 is also grounded at 18 thus connecting the winding 12 across the armature.

In a shunt wound generator of the character which is referred to, the voltage of the generator increases as the speed increases. At any given speed the generated voltage falls as the load increases so that when the automobile head lamps are turned on or when current is otherwise consumed by the current consuming parts of the automobile or its accessories there would be very little current supplied for charging the battery. If there is a substantial amount of load required as in night driving or when using an automobile battery operated radio, over comparatively long stretches of time, the battery would become discharged. Conversely the battery charging rate would be too high and would in time destroy the effectiveness of the battery where the automobile is operated in the daytime over comparatively large distances. In accordance with the present invention, however, means are provided for automatically maintaining the battery charging rate at a substantially constant value regardless of the generator load and regardless of the generator speed. This means is under the manual control of the operator so that he can readily adjust the amount of charging rate as required.

As shown in Fig. 4, and also shown diagrammatically in Fig. 1, 20 designates a suitable casing in which is contained a series of carbon disks forming a carbon pile resistance 21. At one end of the series of disks is a metal washer 22 contacting with a metal stud 23 threaded in an end of the casing and adapted to be electrically connected to the wire 13' which extends to the field winding of the generator. The casing 20 preferably embodies a casing portion 24 of bakelite or similar molded material and a metallic sleeve member 25 which is held in place at one end of the portion 24 by means of a set screw 26. The sleeve member 25 is provided with external threads where it projects beyond the end of the portion 24, and a holding nut 27 is threaded on the sleeve member and holds the end of the casing securely against a metallic supporting plate 29 which is grounded to the automobile frame.

On the casing portion 24 is a winding 30 of sufficiently heavy wire so as to carry the battery charging current, this winding comprising a number of layers of turns which creates a substantial pull on a solenoid plunger 32 provided within the casing and at one end of the winding in alignment with the series of the carbon disks 21. This solenoid plunger 32 is preferably of iron or steel, coated with copper so as to give a good electrical conducting surface and preventing the plunger 32 from clinging to the core of the fixed magnet or flux conducting member 25. Plunger 32 carries the current from the resistance to the metallic sleeve member 25 which is also preferably coated with copper. As the sleeve member 25 is grounded to the supporting plate 29 it will be apparent that the carbon pile resistance which is connected in series with the shunt field winding is grounded so that the current may return through the ground connection to the brush at 17.

The plunger 32 is preferably slidably received in a cylindrical socket provided at the end of the sleeve member 25 in which there is a compression spring 34. One end of this spring bears against the plunger 32 and the other end against a pin or washer member 35. Threaded in the sleeve member 25 is an adjusting stud 36 which may be turned so as to move axially in the direction of the plunger and the carbon pile resistance. A finger operated control knob 37 is fixed to the end of the adjusting stud so that it may be readily controlled to effect the desired pressure of the spring, the spring serving, of course, to hold the carbon pile resistance yieldingly under suitable pressure. The action of the spring, however, is opposed by the solenoid action of the coil and plunger, the plunger tending to be pulled away from the carbon pile resistance in accordance with the amount of current flowing through the coil 30. A spring 39 is preferably provided between the end of the sleeve member 25 and the control knob 37 so as to hold the knob 37 in any desired position of adjustment in a yielding manner.

The wire 13' which is connected to the carbon pile resistance extends to a current indicating device 40 which in turn connects to the field winding 12 so that indications on the device 40 will show generally the heating effect of the field winding generator at any time. An ammeter 42 is preferably provided in series with the battery 11 so as to show the battery charging current at any time. The solenoid coil 30 is connected to the ammeter 42 and to the lead wire 14 which extends to the generator. 43 designates a manual switch of any suitable character by means of which the load 44 may be connected. This load may be the headlights of the automobile, the ignition coil, the radio receiving set and any other accessory to which power is supplied at any time. It will be understood that the ordinary voltage cut-out which interrupts the connection of the generator may be provided in the wire 14 so as to automatically cut the generator in or out at some predetermined minimum generator speed.

It will now be apparent that the solenoid coil 30 carries all of the battery charging current at all times, and automatically controls the pressure on the carbon pile resistance so as to increase or decrease the amount of current in the field winding of the generator automatically in order that the charging rate of the battery may be maintained. If the hand knob 37 has been so set as to provide for a battery charging rate of, let us say, 4 amperes, this battery charging rate will be maintained practically constant, although, of course, some small variations will occur depending upon the state of charge of the battery generator speed, etc. However, for all practical purposes this battery charging rate will be maintained substantially constant regardless of whether the load is great or small and regardless of whether the speed is high or low so long as it is above the speed at which the cut-out becomes effective. Consider the condition of practically no-load at 44. The entire current flowing through the wire 14, that is the entire generator output, is then supplied through the winding 30 to the battery. Under these conditions there will be a certain current flowing in the field winding and through the current indicating device 40 and the carbon pile resistance 21. If the speed of the generator is then increased somewhat, the generated voltage will then increase and current flowing to the battery will then tend to be increased, but any increase in the battery charging current will cause the solenoid to so affect the carbon pile as to increase its resistance and this will automatically cut down the field current of the generator so as to maintain the charging rate substantially constant. Let us now assume that the headlights are turned on so that there will be a substantial flow of current required in the load circuit through the switch 43, now closed. Throwing on the load ordinarily would tend to decrease the generator voltage, and with a drop in generated voltage the battery charging current would fall possibly to zero. Any decrease in current through the winding 30, however, would very materially decrease the pull on the plunger in opposition to the spring and thus the spring would act to very considerably increase the pressure on the carbon pile resistance so that there would be an increase in current flowing in the field winding which would maintain the voltage of the generator so as to maintain the desired flow of current through the coil 30 and to the battery. The result is that the battery charging current is maintained practically constant regardless of the generator load and regardless of the speed of the generator except, of course, under idling conditions in which the automatic cut-out, if set to operate at a point below the idling speeds, would interrupt the circuit from the generator.

The automatic regulator is preferably used with a simple fixed brush shunt wound generator because a generator of that type is very simple in construction and economical in cost. The manual control of the control knob 37 which is preferably provided adjacent the driver's location affords a means of readily adjusting the charging rate so that the use of a third brush type of generator is not required. However, the device shown in Fig. 4 may also be used in conjunction with a third brush type of generator and will give practically uniform charging rate regardless of the speed of the generator and, of course, for any given speed the load may be widely varied without affecting the charging rate supplied to the battery. The automobile could, therefore, be driven in daytime over long trips under conditions where the external load of the generator is negligible and under such conditions the hand control knob 37 is so set as to provide a charging rate of minimum value sufficient to take care of the starting loads on the battery. If, however, it is intended that the automobile should be so operated as to rather continuously require large current supply to the battery, the control knob 37 is set to provide a suitable charging rate during the time the car is in use and then if it is found that the battery is maintained fully charged, of course, the charging rate can be reduced somewhat. The battery is therefore always maintained in a charged condition and overcharge is guarded against.

While other types of variable resistance might be used in place of the carbon pile resistance herein shown and described, for the control of the current in the shunt field winding, the carbon pile resistance is particularly desirable as it affords a satisfactory and accurate control through a wide range of current values. When the field current is greatest, the heat required to be dissipated by the carbon pile resistance is effectively taken care of since the entire carbon pile is in circuit, the heat being dissipated from the casing and through the metallic parts of the apparatus which are mechanically connected to the metal supporting plate 29. When the field current is a minimum the resistance of the carbon pile resistance must be comparatively large but this is readily provided for by reducing the pressure on the plates of the carbon pile while still maintaining the entire resistance in circuit.

The battery charging regulator is preferably constructed as a compact self-contained unit as shown in Figs. 2 and 3 which may be readily connected to the instrument board of the automobile adjacent the driver's location and electrically connected by wires which extend to the generator, armature, battery, etc. The unit embodies the supporting plate 29 that has been previously mentioned, which may be reversely bent as indicated at 47 at its upper end so it may be connected by means of bolts 45 to the rearwardly extending lower side of the instrument panel 46 in front of the driver. The current indicating device which is connected in series with the shunt field winding and identified by the numeral 40, is supported by means of a metal strap 48 so that the indicating needle 49 is visible to the operator. 50 designates a small dash lamp which illuminates the dial of the current indicator 40. The manually adjustable knob 37 is provided in a readily accessible position so that the pilot may instantly, merely by turning the knob, control the battery charging rate so that the battery will be supplied with the proper current values taking into consideration the number of times the battery will be needed for starting the engine, and the condition of the battery charge.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An automobile battery charging regulator of the character described comprising a casing, a screw adjustably threaded in one end of the casing and projecting from the casing, a carbon pile resistance in said casing in electrical connection with said screw, a solenoid coil on said casing adapted to carry the battery charging current, a solenoid plunger in said casing bearing at one end against the carbon pile, a sleeve member of magnetic material in axial alignment with the other end of said plunger, the plunger having limited axial movement with respect to said sleeve member, an adjusting element in said sleeve member, means for axially moving said adjusting element, and a spring provided between said adjusting element and said plunger for normally urging said plunger against the carbon pile, said plunger being operated by said coil in opposition to the action of the spring.

2. An automobile battery charging regulator of the character described comprising a casing, a carbon pile resistance provided in one end of said casing, means for conducting current to one end of said carbon pile resistance, a solenoid coil on said casing adapted to carry the battery charging current, a solenoid plunger in said casing bearing at one end against the carbon pile, a sleeve member of magnetic material in axial alignment with the other end of said plunger, the plunger having limited axial movement with respect to said sleeve member, an adjusting element in said sleeve member, means for axially moving said adjusting element, and a spring provided between said adjusting element and said plunger for normally urging said plunger against the carbon pile, said plunger being operated by said coil in opposition to the action of the spring.

ALBERT C. SENGER.